(12) United States Patent
King

(10) Patent No.: US 6,330,922 B1
(45) Date of Patent: Dec. 18, 2001

(54) BEDDING PLOW FEATURING A CENTER-CUT DISK ASSEMBLY HAVING RESILIENT RELIEF MEANS

(76) Inventor: Thomas P. King, 16190 Forest Glen Ct., Punta Gorda, FL (US) 33982

( * ) Notice: Subject to any disclaimer, the term of this patent is extended or adjusted under 35 U.S.C. 154(b) by 0 days.

(21) Appl. No.: 09/616,755

(22) Filed: Jul. 14, 2000

Related U.S. Application Data

(60) Provisional application No. 60/143,833, filed on Jul. 14, 1999.

(51) Int. Cl.[7] ................................................. A01B 49/02
(52) U.S. Cl. ...................... 172/166; 172/184; 172/195; 172/201; 172/265; 172/574; 172/657; 172/686; 172/696; 172/701
(58) Field of Search ...................................... 172/201, 497, 172/500, 518, 539, 540, 551, 554, 595, 596, 694, 701, 166, 184, 265, 574, 657, 195, 686, 696

(56) References Cited

U.S. PATENT DOCUMENTS

| | | | |
|---|---|---|---|
| 4,484,636 | * 11/1984 | Hodgson | 172/701 X |
| 4,828,041 | * 5/1989 | Cosson | 172/701 X |
| 4,867,247 | * 9/1989 | Heckendorf | 172/573 |
| 5,477,931 | * 12/1995 | Grant | 172/701 |

* cited by examiner

*Primary Examiner*—Christopher J. Novosad
(74) *Attorney, Agent, or Firm*—William E. Noonan

(57) ABSTRACT

A bedding plow suited for forestry planting operations includes a plow frame that is attached to a tractor or other tow vehicle. The frame holds a pair of trailing disk assemblies that are arranged along opposite longitudinal sides of the bed being plowed. A center-cut disk assembly is mounted pivotably to the frame between and forwardly of the trailing disk assemblies. A resilient biasing assembly such as a hydraulic or pneumatic relief mechanism interconnects an arm of the center-cut disk assembly and the frame. The resilient biasing device urges the center-cut disk assembly to engage the ground under normal circumstances and permits the disk assembly to retract upwardly and ride over obstructions that are encountered while the plow cultivates the bed.

9 Claims, 7 Drawing Sheets

BEDDING PLOW FEATURING A CENTER-CUT DISK ASSEMBLY HAVING RESILIENT RELIEF MEANS

RELATED APPLICATION

This application claims the benefit of U.S. Provisional Patent Application Ser. No. 60/143,833 filed Jul. 14, 1999.

FIELD OF THE INVENTION

This invention relates to a bedding plow and, more particularly, to a forestry bedding plow featuring a center cut disk assembly. The disk assembly includes hydraulic or other resilient means of relief.

BACKGROUND OF THE INVENTION

In forestry bedding operations it is usually desirable to precut a furrow as it is being plowed or tilled. This process eliminates, or at least reduces re-growth of weeds, competitive trees, grasses, etc. in the center of bed and thereby significantly improves the likelihood that planted seedlings will survive and thrive. Traditionally, precutting has been performed by fixed rippers and similar implements. Plows employing such devices normally must be pulled by relatively expensive tractors having sufficient horsepower to overcome stumps, rocks and other obstacles encountered by the plow. Moreover, when a fixed ripper engages an obstruction, the entire plow tends to be disrupted and there is usually a significant delay before the plow stabilizes. As a result, part of the bed proximate the obstruction may be poorly cultivated or missed by the plow entirely.

As an alternative to fixed rippers, offset harrow type plows have been used to precut or center-cut the bed. Also, standard bedding plows have been drawn in multiple passes over the bed. These techniques are typically time consuming, machinery intensive and quite costly. Virtually all of the known techniques for precutting forestry beds have been inefficient. Significantly improved efficiency is required, particularly for bedding operations in the forestry industry. At the same time, an effective center-cut and successful, high yield cultivation must be achieved.

SUMMARY OF THE INVENTION

It is therefore an object of this invention to provide a bedding plow that effectively precuts a planting bed so that re-growth of competitive trees, weeds, grasses, etc. is minimized and successful, high yield planting results are achieved.

It is a further object of this invention to provide a bedding plow which center-cuts or precuts a forestry bed in a highly efficient manner and which eliminates the need for expensive, complex and high horsepower equipment.

It is a further object of this invention to provide a bedding plow that effectively and efficiently performs center-cutting of a forestry bed in a single pass, and which eliminates the time and expense required by machines that are employed in multiple passes.

It is a further object of this invention to provide a bedding plow that employs a center-cutting disk assembly with hydraulic or other means of spring relief that permits the plow to transcend obstructions in the bed without causing significant disruption to the plow.

It is a further object of this invention to provide a bedding plow that avoids significant disruption when encountering obstructions in the bed being plowed so that the bed is successfully cultivated without significant gaps or missed regions.

It is a further object of this invention to provide a bedding plow that may be used particularly efficiently and effectively in forestry applications.

This invention features a bedding plow apparatus including a frame that is selectively attached to and pulled by a tractor or other tow vehicle. At least three sets of disk assemblies are mounted to the frame and engaged with the bed to be plowed. In particular, the apparatus includes a pair of trailing disk assemblies that are attached to and pulled behind the frame and disposed along respective longitudinal sides of the bed. Each trailing disk assembly includes a trailing arm that is attached at its forward end to the frame. Each trailing disk assembly also includes at least one trailing disk that is mounted to the trailing arm proximate a distal end of the arm. A center-cut disk assembly is attached to the frame between the trailing disk assemblies. The center-cut disk assembly includes a center-cut arm that is pivotably attached proximate a forward end to the frame. At least one center-cut disk is attached proximate an opposite distal end of the center-cut arm. A resilient relief mechanism interconnects an intermediate portion of the center-cut arm with the frame. The resilient relief mechanism urges the center-cut disk assembly to engage the bed so that each disk in the center-cut disk assembly precuts the bed as the plow is pulled through the bed by the tow vehicle.

In a preferred embodiment, each center-cut disk is rotatably mounted to the center-cut arm. Each center-cut disk may be disposed at a positive angle relative to the longitudinal axis of the bed and the plow. The center-cut disk or disks are preferably disposed axially forwardly of the trailing disks.

The resilient relief mechanism may include a hydraulic relief device such as an accumulator. Hydraulic relief means or other forms of resilient relief may interconnect each of the trailing disk assemblies and the frame. More particularly, a hydraulic relief mechanism may interconnect each trailing arm and the frame.

An additional implement such as a wheel/packer assembly may be interconnected to the frame and pulled behind the plow generally rearwardly of the trailing disk assemblies. The frame of the plow may include a drawbar and a support portion attached to the drawbar. The disk assemblies are connected to the support portion.

BRIEF DESCRIPTION OF THE DRAWINGS

Other objects, features and advantages will occur from the following description of a preferred embodiment and the accompanying drawings, in which.

Figure 1:
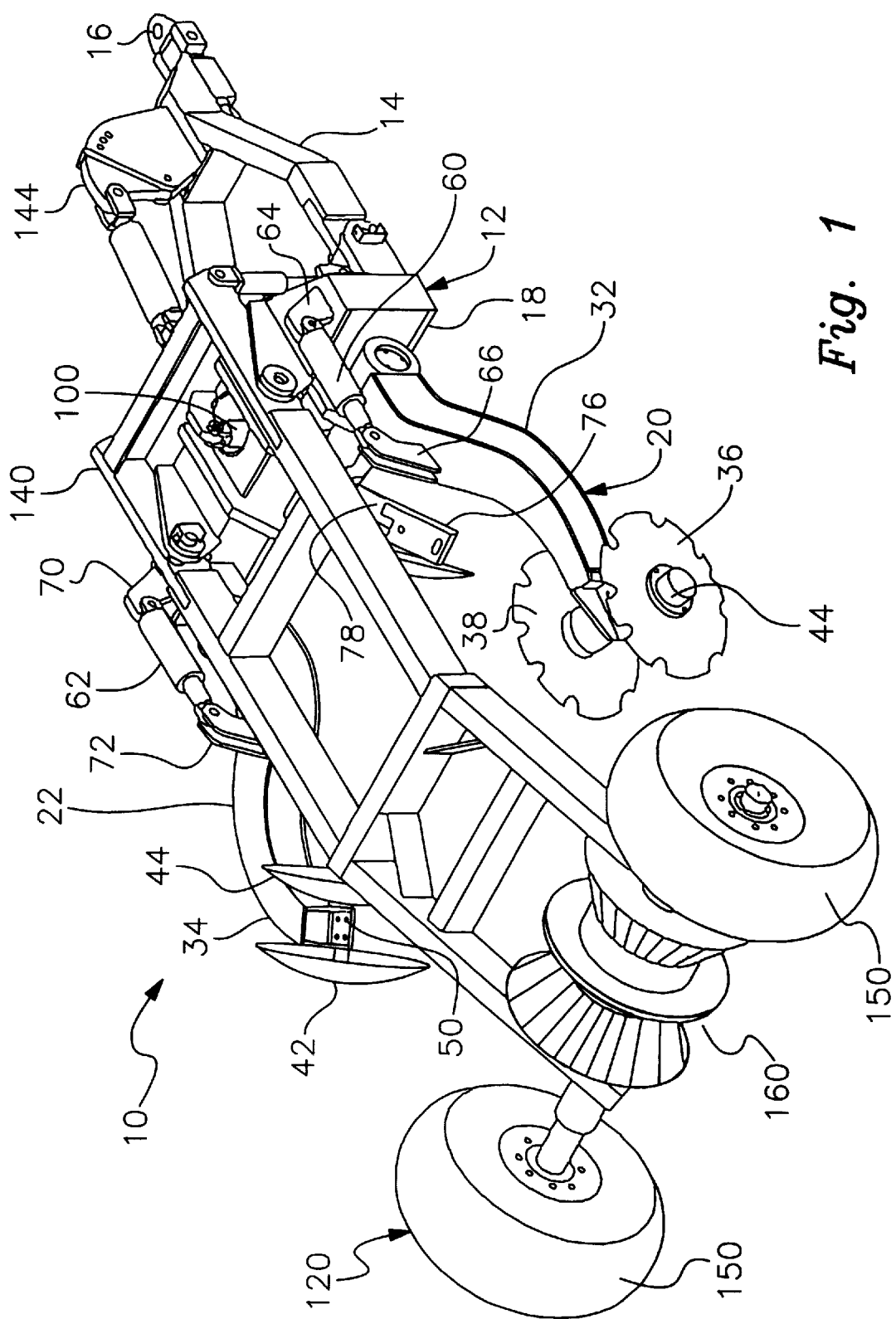
FIG. 1 is a perspective view of a preferred bedding plow according to this invention.

There is shown in FIGS. 1 through 3A a bedding plow 10 designed primarily for use in forestry bedding applications. The version of plow 10 shown in FIG. 1 is almost identical to the version shown in FIGS. 2 and 3A. The plows differ only in that they employ slightly different wheel/packer assemblies 120, 130. Those respective assemblies are explained more fully below. In any event, the use of a wheel/packer assembly is optional and plow 10 may be operated without such an attachment.

Figure 3A:
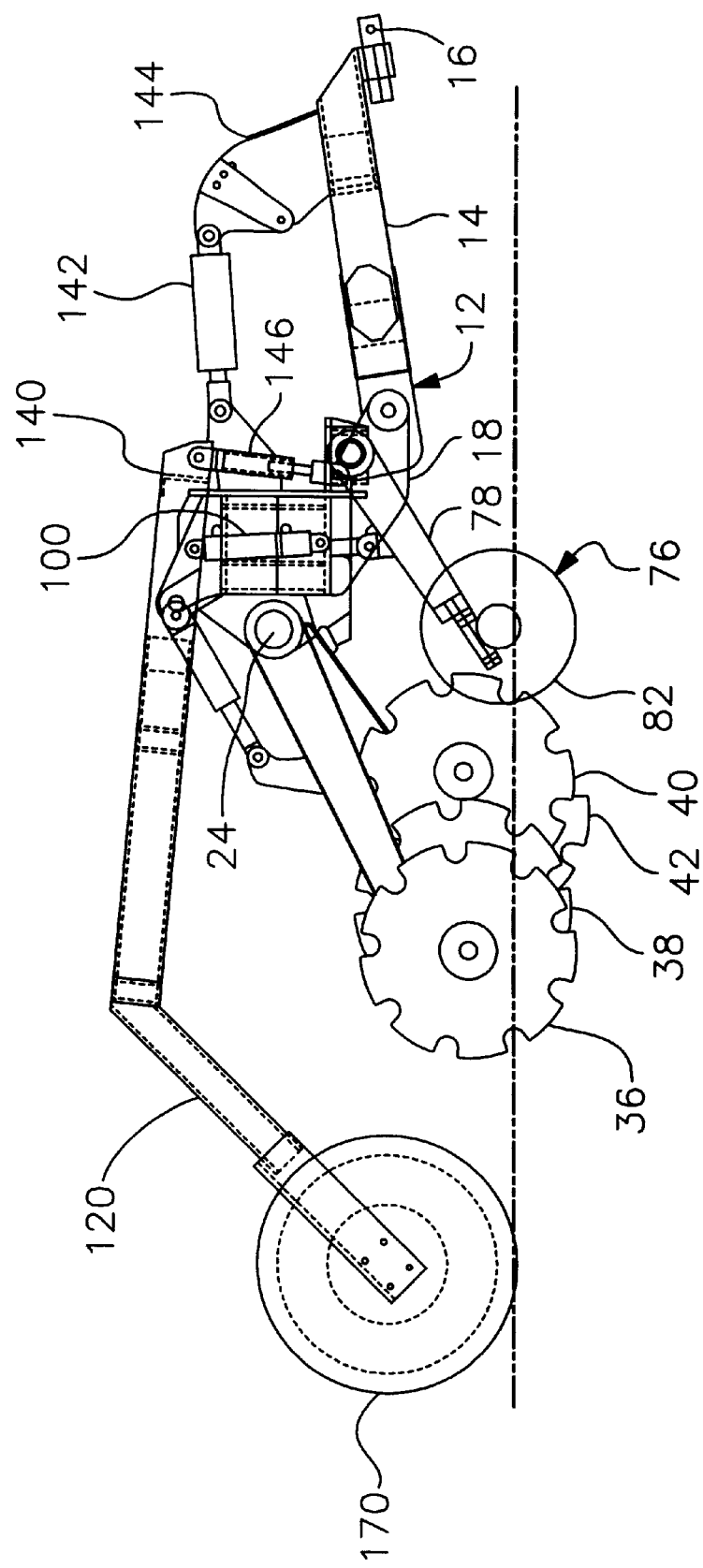
FIG. 3A is a side elevational view of the plow of FIG. 2.
Figure 3B:
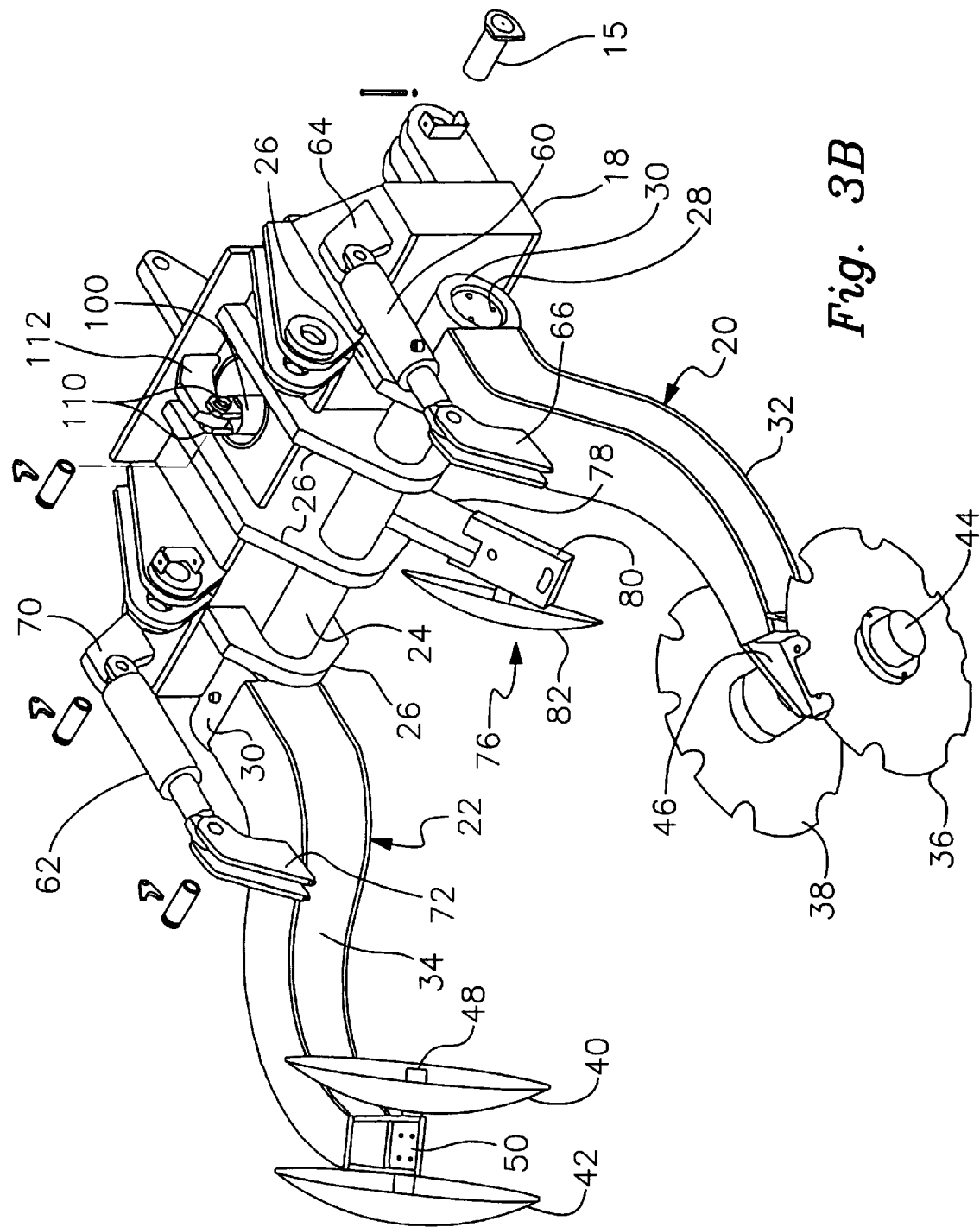
FIG. 3B is a perspective, partly exploded view of the support portion of the frame, the trailing disk assemblies and the resiliently biased center-cut disk assembly.

Plow 10 includes a frame 12 that is secured in a standard manner to a tractor or other type of tow vehicle, not shown. More particularly, frame 12 includes a drawbar 14 that carries a hitchpin bracket 16 at its forward end. The hitchpin bracket is interengaged by a pin, not shown, to the tractor in a standard manner. Frame 12 also includes a support portion 18 that is secured to drawbar 14 by welding, bolts or other conventional means. For example, as shown in FIG. 3B the support portion may be releasably interconnected to the drawbar by a pair of pins 15, only one of which is shown. The frame 12 is composed of steel or other durable metals or metal alloys.

Various plowing attachments are operably interconnected to support portion 18 or frame 12 in accordance with this invention. As shown in FIGS. 1 through 3A and most clearly in FIG. 3B, a pair of trailing disk assemblies 20 and 22 are pivotably mounted to support portion 18 by a transverse shaft 24. As best shown in FIG. 3B, shaft 24 is mounted rotatably through flanges 26 of support portion 18. The respective ends of shaft 24 are mounted by bearings 28 within respective cylinders 30. Each cylinder is pinned or otherwise attached to a respective trailing disk assembly 20, 22. More particularly, assembly 20 includes a trailing arm 32 that is welded at its forward end to right-hand cylinder 30; and assembly 22 includes a similar trailing arm 34 that is likewise attached at its forward end to the left-hand cylinder.

The opposite, distal end of each trailing arm carries one or more trailing disks. In particular, a first pair of trailing disks 36, 38 are mounted proximate the distal end of trailing arm 32. A second pair of trailing disks 40, 42 are similarly mounted proximate the distal end of trailing arm 34. In the version described herein, the trailing disks in each assembly are rotatably mounted by a respective shaft within a bearing housing carried at the end of the trailing arm. A first shaft 44 axially interconnects disks 36 and 38 and is itself rotatably mounted within a bearing housing 46 located proximate the distal end of trailing arm 32. A second shaft 48 likewise axially interconnects disks 40 and 42 and rotatably mounts those disks rotatably within a second bearing housing 50 that is supported proximate the distal end of trailing arm 34. It should be noted that in alternative embodiments, the trailing disks may be fixedly attached proximate the distal ends of the trailing arms. Alternative numbers and arrangements of trailing disks and trailing disk arms may also be utilized. The particular construction of the trailing disk assemblies should be well known to persons skilled in the art and do not constitute a limitation of this invention. The trailing disks are typically orientated at a positive angle relative to the longitudinal axis of the bed. This means that the cutting edge of each trailing disk is disposed in a plane that is not parallel to the longitudinal axis of the bed. In the embodiment shown in FIGS. 1 through 4, this angle is set by providing the trailing arms with the curvature that is shown. In alternative embodiments, this curvature may be varied to provide other angles for the trailing disks. In still other versions, essentially straight trailing arms may be employed and other structure may be utilized to angle the trailing the disks relative to the longitudinal axis of the plow and the planting bed.

Each of the trailing disk assemblies 20 and 22 is also interconnected to support portion 18 by a respective hydraulic or pneumatic relief mechanism. As shown in FIGS. 1 through 3B, a first relief mechanism 60 is interconnected between trailing arm 32 of assembly 20 and the right-hand side of support portion 18. A second relief mechanism 62 interconnects trailing arm 34 and the left-hand side of support portion 18. Mechanism 60 includes a standard accumulator or other form of hydraulic or pneumatic piston. Various other types of resilient or shock absorption means may also be employed (e.g. mechanical spring means). One end of mechanism 60 is interconnected to a bracket 64 carried by support portion 18. The other end of mechanism 60 is interconnected to a bracket 66 that extends upwardly from trailing arm 32. Similarly, relief mechanism 62 is operably interconnected between brackets 70 and 72 attached to support portion 18 and trailing arm 34, respectively. Pivot pins 73 and 75, FIG. 3B, form the interconnection. Similar pins are used for the other relief mechanism 60. These relief mechanisms are pre-loaded or biased to urge the trailing disks 36, 38, 40 and 42 downwardly into engagement with the bed. When the trailing disks engage an obstruction, such as a stump or boulder in the bed, the hydraulic relief mechanisms 60 and 62 permit the disks and trailing arms to pivot upwardly so that the plow rides over the obstruction. When the obstruction is cleared, the trailing disk assembly is then urged downwardly by its respective relief mechanism 60, 62 to engage the disks with the bed.

A critical and distinctive feature of this invention is the employment of a resiliently biased center-cut disk assembly 76, which is disposed between trailing arm disk assemblies 20 and 22. In the version shown in FIGS. 1 through 3B, disk assembly 76 comprises an elongate center-cut arm 78 that is pivotably mounted at its upward end to support portion 18. This manner of attachment is described more fully below in connection with FIG. 4. The lower distal end of arm 78 carries a bearing housing 80. A single center-cut disk 82 is axially rotatably mounted to bearing housing 80. It should be understood that, in alternative embodiments, the center-cut disk assembly may employ fixed or non-rotating disks instead of the rotating disks shown herein. More particularly, disk 82 is axially mounted on a shaft 83 that is supported within bearing housing 76 in a conventional manner. Preferably, the disk is orientated at a positive angle (e.g. at least 1°) relative to the longitudinal axis of the plow and the longitudinal axis of the bed being cultivated.

Figure 4:
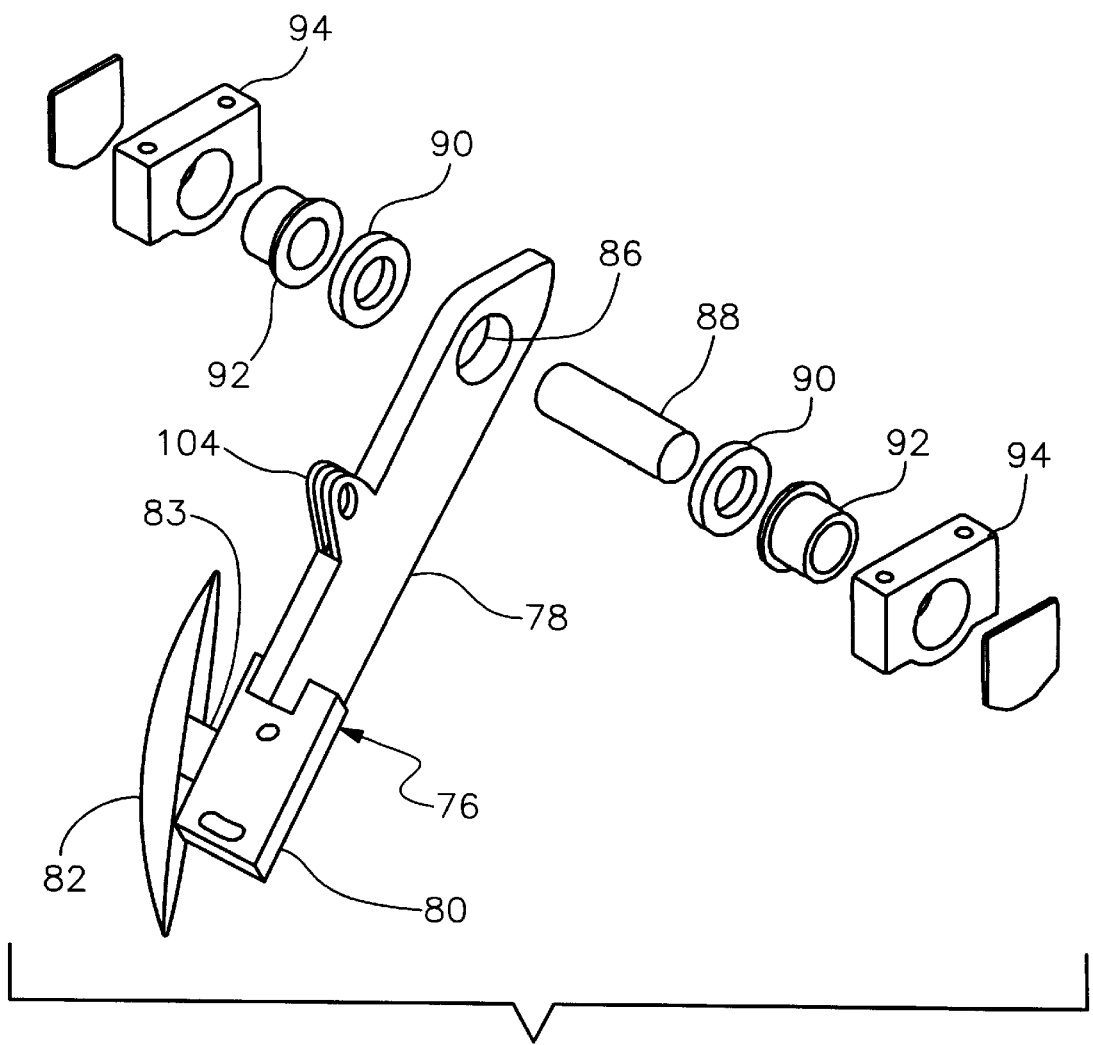
FIG. 4 is an isometric exploded view of the center-cut disk assembly.
Figures 5, 6:
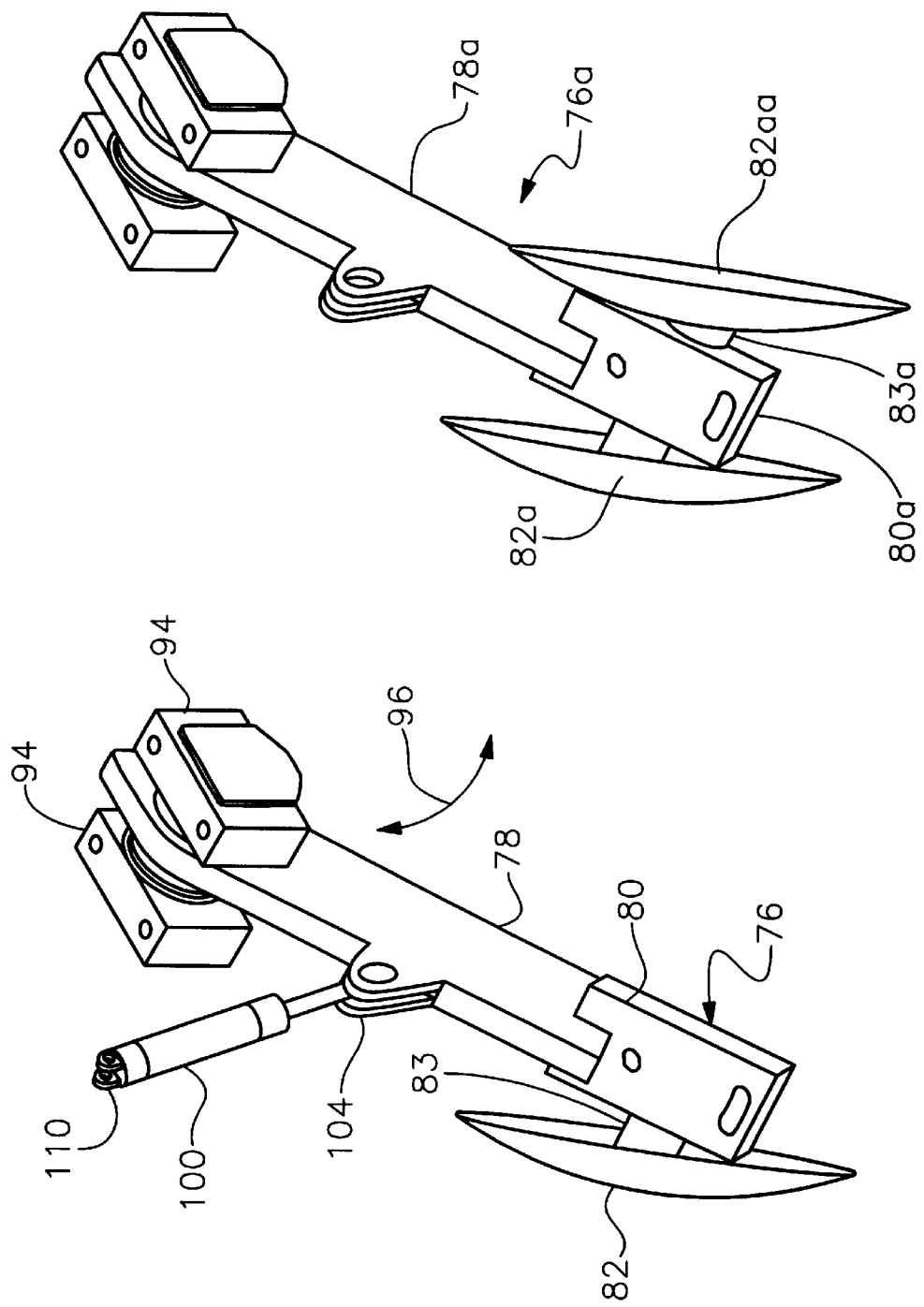
FIG. 5 is an isometric view of the center-cut disk assembly in an assembled condition.
FIG. 6 is a perspective view of an alternative center-cut disk assembly that employs two disks.

As shown in FIG. 4, center-cut arm 78 has a hole 86 formed proximate its upward forward end. Hole 86 receives a mounting pin 88. A pair of washers 90 are carried by pin 88 on respective sides of arm 78. These washers separate the center-cut arm from a pair of bushings or bearings 92 likewise located on opposite sides of the center-cut arm. Bearings 92 are engaged with respective projections 94 of support portion 18. As a result, when the center-cut disk assembly 76 is installed within the plow, as shown in FIG. 5, the trailing arm 78 is pivotably mounted to pin 88 between projections 94 of support portion of the frame. The center-cut arm and therefore the entire center-cut disk assembly, are capable of pivoting upwardly and downwardly, as indicated by doubleheaded arrow 96.

Means are provided for resiliently biasing disk 82 of assembly 76 into engagement with the bed being plowed. Such means include a pneumatic or hydraulic relief mechanism 100, FIGS. 1 through 3B. Mechanism 100 preferably comprises a pre-loaded nitrogen filled accumulator or similar apparatus. Alternative hydraulic, pneumatic or mechanical (e.g. spring loaded) shock absorbers and other resilient biasing means may also be employed. Mechanism 100 is interconnected between support portion 18 of frame 12 and center-cut arm 78 of assembly 76. Arm 78, FIGS. 4 and 5, includes a pair of mounting lobes 104 having aligned openings therein. The lower end (e.g. the piston rod) of relief mechanism 100 is engaged with aligned openings in lobes 104 and connected to the lobes by an appropriate pivot pin. As best shown in FIGS. 1 through 3B, the upper end of mechanism 100 (e.g. the piston cylinder) carries its own pair of lobes 110 that are pivotably interconnected to a mounting arm or projection 112 attached to support portion 18.

Mechanism 100 is preloaded with a desired biasing force that urges arm 78 and therefore center-cut disk 82 downwardly to engage the planting bed with a corresponding degree of force. As a result, when the plow is pulled through the bed, a desired level of center-cutting is acheived. By the same token, when disk 82 of center-cut assembly 76 engages an obstruction such as a stump or boulder, mechanism 100 permits disk 82 and arm 78 to pivot upwardly about pin 88 (FIG. 4). The center-cut disk is therefore allowed to clear the obstruction quickly and cleanly without disrupting the entire plow. As soon as the obstruction is traversed, hydraulic mechanism 100 urges arm 78 and disk 82 back into plowing or tilling engagement with the forestry bed. The disk continues cultivating the bed with little or no disruption to the plow. An effective center-cut or precut is formed in the bed and improved seedling growth is achieved. Because the center-cut is formed so effectively, with few gaps or missed regions, the use of the resiliently biased center-cut disk assembly eliminates the need to perform multiple passes and/or the use of more complex machinery. Improved planting efficiency and cost savings are obtained. Similarly, the use of the resiliently biased center-cut disk assembly significantly reduces the need to use large horsepower tractors. Again, this improves cultivating and planting efficiency considerably.

Center-cut disk 82 is disposed axially forwardly of trailing disks 36, 38, 40 and 42. As a result, when the plow is operated the center disk assembly is pulled to precut the center of the bed while the trailing disks till the soil and form a mound over the precut center of the bed. This creates an improved cultivated bed that is particularly effective for achieving successful seedling growth.

Figure 7:
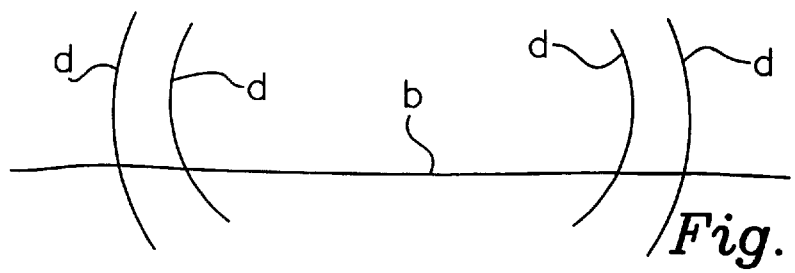
FIG. 7 is a cross sectional view taken along the longitudinal center axis of the bed illustrating schematically how prior art disks cultivate the bed.
Figure 8:
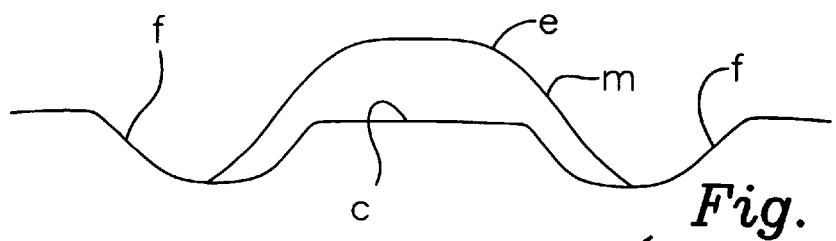
FIG. 8 is a view similar to FIG. 7 illustrating the results that are achieved using a conventional disk arrangement as shown in FIG. 7.

The improvements in cultivating a bed achieved by the center-cut disk assembly of this invention are further illustrated in FIGS. 7–10. In each view, the bed being cultivated is shown cross sectionally facing longitudinally in the direction of the bed. FIG. 7 schematically depicts two opposing pairs of prior art disks d that are arranged, in the manner described above, along respective sides of the plow. These disks d are pulled through the bed b so that the bed is cultivated in the manner shown in FIG. 8. Specifically, the disks d form a pair of spaced apart furrows f arranged longitudinally in bed b. Earth e from furrows f is pushed by disks d into a mound m that covers a center portion c of the bed. Center portion c remains uncut and is covered by loose earth e.

Figure 9:
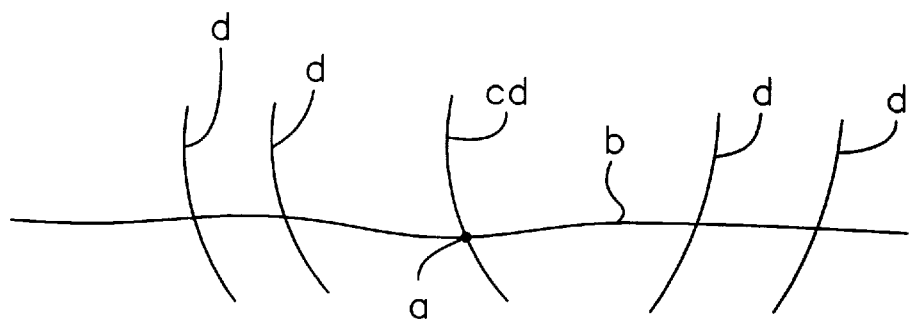
FIG. 9 is a schematic view similar to FIG. 7 depicting cultivation of the bed with the additional use of the center-cut disk assembly of this invention.
Figure 10:
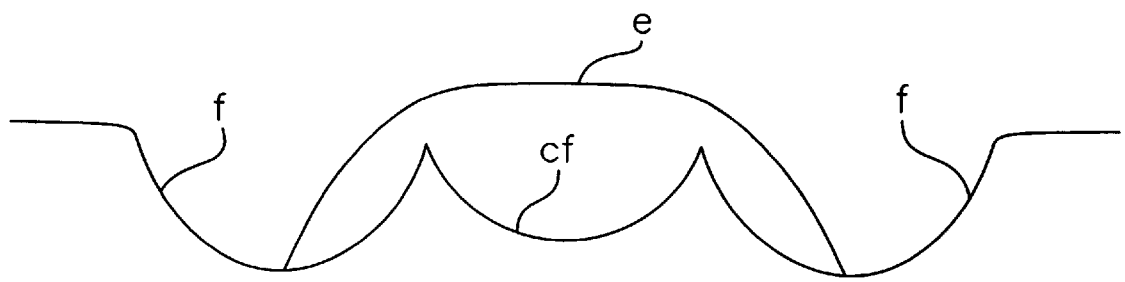
FIG. 10 is a view similar to FIG. 8 which illustrates the cultivated bed that is achieved using the present invention.

In the present invention, FIG. 9, a center disk cd is positioned between opposing pairs of disks d such that the center disk cd intersects and interengages the longitudinal axis a of bed b. When the plow is pulled in the above described manner, center disk cd cuts bed b such that a center furrow cf is formed in the manner shown in FIG. 10. This center furrow is then covered with earth e by the trailing disks d that scoop earth out of furrows f and deposit it over center furrow cf. As shown in FIG. 10, the bed is cultivated much more effectively and improved forestry and planting results are achieved.

Various number of disks may be employed in the center-cut disk assembly. As depicted in FIG. 6, alternative assembly 76a includes a pair of disks 82a and 82aa mounted rotatably on respective sides of center-cut arm 78a. A shaft 83a axially interconnects disks 82a and 82aa and rotatably mounts those disks to bearing housing 80a. The disks are again orientated such that they maintain a positive angle of at least 1° with the longitudinal axis of the center-cut arm 78a, as well as the longitudinal axis of the plow and the bed being cultivated. In all other regards, disk assembly 76a is constructed and operates analogously to the single disk version previously described. A piston, accumulator or other hydraulic, pneumatic or mechanical relief means resiliently interconnect the disk assembly to the frame of the plow. The relief mechanism is omitted for clarity in FIG. 6 but it may comprise structure identical or analogous to the structure previously described. In still other versions, a virtually unlimited number of opposing center-cut disks may be employed.

Figure 2:
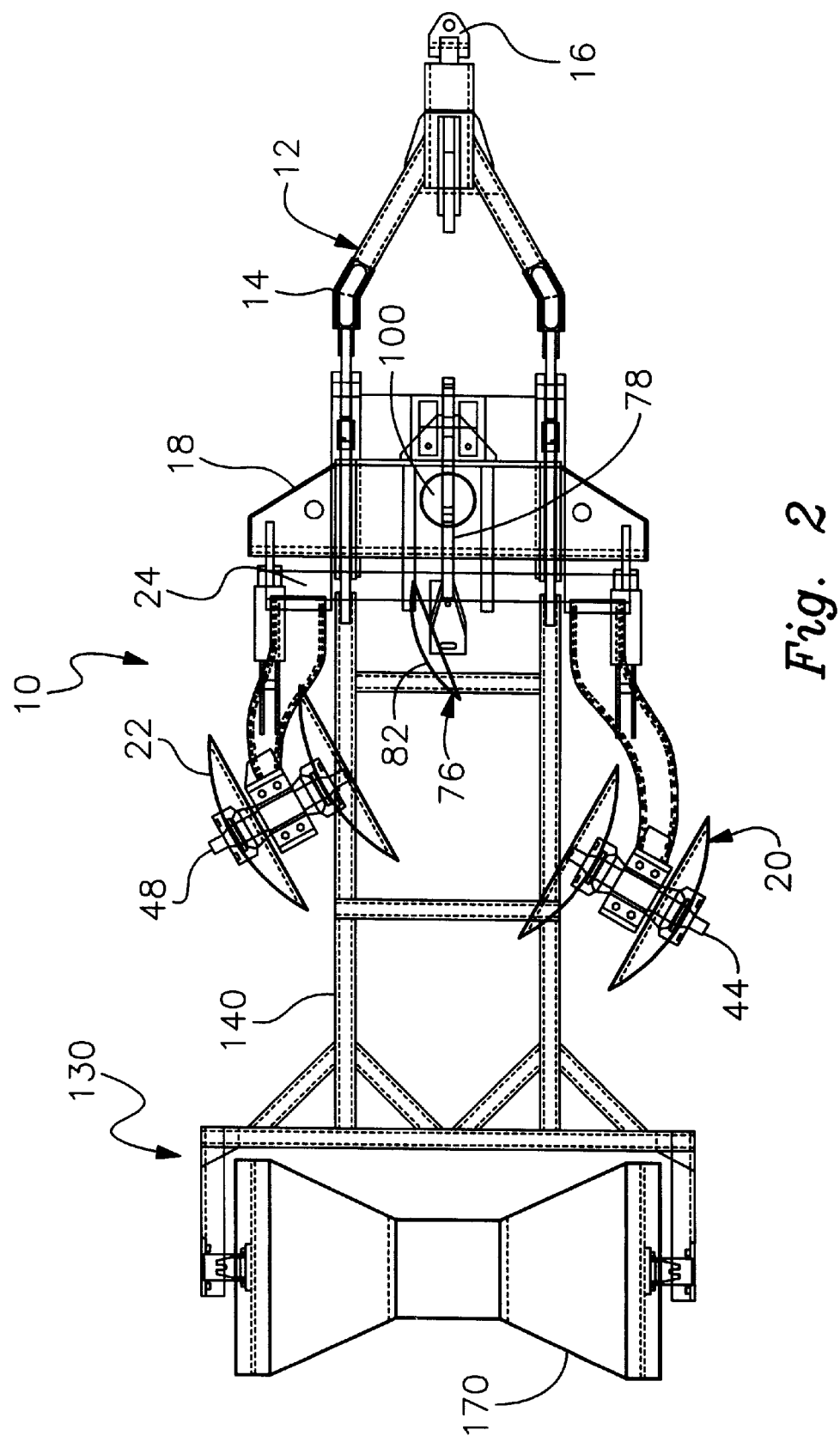
FIG. 2 is a top plan view of a similar bedding plow according to the invention, which plow features an alternative wheel/packer assembly.

As illustrated in FIG. 1, bedding plow 10 may also include an optional wheel/packer apparatus 120. An alternatively configured wheel/packer apparatus 130 is shown in FIGS. 2 and 3. In either case, the wheel/packer apparatus includes an elongate frame 140 that is mounted to support frame 12. A gas filled horizontally arranged accumulator 142 is interconnected between the forward end of frame 140 and a mounting assembly 144 carried by drawbar 14. A second, substantially vertical accumulator 146 interconnects the forward end of frame 140 and support portion 18. Various other accumulator orientations (e.g. diagonal) may be also used. Accumulators 142 and 146 allow the wheel/packer assembly to again provide resilient bias to the wheel/packer apparatus. As a result, wheels 150, FIG. 1, and drums 160, FIG. 1, and 170, FIGS. 2 and 3, remain engaged with the bed under normal conditions but are permitted to retract upwardly and ride over obstructions when required. The hydraulic relief means again allow the bedding plow to operate stably under virtually all conditions. Disruption of the plow is avoided and improved plowing results are achieved. Again, it should be understood that the wheel/packer mechanisms shown in FIGS. 1 through 3 are optional features of the plow only and may be eliminated within the scope of this invention. Still other optional features may be connected to the frame in accordance with this invention.

The various disk assemblies employed in plow 10 are constructed of durable and rugged material such as steel and other metals and metal alloys, which are commonly used in the plow industry and in related applications.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. A bedding plow apparatus that is operably attachable to a tow vehicle for plowing a forestry bed, said apparatus comprising:
- a frame attachable to and adapted for being pulled by the two vehicle along the forestry bed;
- a pair of trailing disk assemblies depending from said frame and disposed generally along respective longitudinal sides of the bed, each said trailing disk assembly including a trailing arm that is pivotably connected proximate a forward end thereof to said frame and at least one trailing disk that is mounted to said trailing arm proximate a distal end thereof such that said trailing disk is pulled through the bed as said frame is pulled by the tow vehicle;
- a center-cut disk assembly depending from said frame laterally between said trailing disk assemblies, said center-cut disk assembly including a center-cut arm pivotably attached proximate a forward end thereof to said frame and at least one center-cut disk mounted to said center-cut arm proximate an opposite distal end thereof, each said center-cut disk being cuttably engagable with a longitudinal center axis of the forestry bed; and
- a relief mechanism resiliently interconnecting an intermediate portion of said center-cut arm with said frame and urging said center-cut disk assembly to extend downwardly and engage the bed so that each said center-cut disk precuts the longitudinal center axis of the bed as the frame is pulled by the tow vehicle along the forestry bed; said relief mechanism further permitting said center-cut disk assembly to retract upwardly and traverse obstructions in the bed.

2. The plow of claim 1 in which each center-cut disk is axially rotatably mounted to said center-cut arm.

3. The plow of claim 1 in which each center-cut disk is oriented at a positive angle relative to the longitudinal axis of the foresting bed.

4. The plow of claim 1 in which each center-cut disk is disposed forwardly of said trailing disks relative to the direction the plow travels when being pulled along the forestry bed by the tow vehicle.

5. The plow of claim 1 in which said relief mechanism includes at least one of a hydraulic and a pneumatic accumulator.

6. The plow of claim 1 further including a pair of secondary resilient relief mechanisms, each interconnecting said frame and a respective one of said trailing arms for urging said trailing disk assemblies to extend into engagement with the foresting bed and permitting said trailing disk assemblies to retract and traverse obstructions in the bed.

7. The plow of claim 1 in which said plow further includes a wheel/packer mechanism mounted pivotably to said frame and having a rotatable drum located longitudinally behind said trailing disk assemblies and interengagable with the forestry bed.

8. The plow of claim 7 further including resilient relief means interconnecting said wheel/packer mechanism and said frame for urging said drum into interengagement with the bed and permitting said wheel packer mechanism to retract and traverse obstructions in the bed.

9. The plow of claim 1 in which said frame includes a drawbar that is attachable to the tow vehicle and a support portion attached to said drawbar, said trailing and center-cut disk assemblies being connected pivotably to said support portion.

* * * * *

UNITED STATES PATENT AND TRADEMARK OFFICE
CERTIFICATE OF CORRECTION

PATENT NO.    : 6,330,922 B1
DATED         : December 18, 2001
INVENTOR(S)   : Thomas P. King It is certified that error appears in the above-identified patent and that said Letters Patent is hereby corrected as shown below:

<u>Column 7,</u>
Line 6, change "two vehicle" to -- tow vehicle --.

Signed and Sealed this

Thirteenth Day of August, 2002

Attest:

JAMES E. ROGAN
Attesting Officer        Director of the United States Patent and Trademark Office